United States Patent
Lee

(10) Patent No.: US 9,832,033 B1
(45) Date of Patent: Nov. 28, 2017

(54) HOME CONTROL SYSTEM

(71) Applicant: DEXATEK TECHNOLOGY LTD., New Taipei (TW)

(72) Inventor: Wun-Lin Lee, New Taipei (TW)

(73) Assignee: Dexatek Technology Ltd., New Taipei (TW)

(*) Notice: Subject to any disclaimer, the term of this patent is extended or adjusted under 35 U.S.C. 154(b) by 0 days.

(21) Appl. No.: 15/162,661

(22) Filed: May 24, 2016

(51) Int. Cl.
*H04L 12/28* (2006.01)
*G08C 17/02* (2006.01)
*G06F 13/10* (2006.01)

(52) U.S. Cl.
CPC ........ *H04L 12/2816* (2013.01); *G06F 13/102* (2013.01); *G08C 17/02* (2013.01); *G08C 2201/42* (2013.01); *G08C 2201/93* (2013.01)

(58) Field of Classification Search
None
See application file for complete search history.

(56) References Cited

U.S. PATENT DOCUMENTS

| 8,908,210 B2 * | 12/2014 | Rhodus | H04M 1/72533 358/1.1 |
| 2012/0068857 A1 * | 3/2012 | Rothkopf | G08C 19/28 340/870.07 |

* cited by examiner

*Primary Examiner* — Leon-Viet Nguyen
(74) *Attorney, Agent, or Firm* — Alan D. Kamrath; Kamrath IP Lawfirm, P.A.

(57) ABSTRACT

A home control system has at least one peripheral device, a controlling device, and a mobile device. The mobile device determines whether the controlling device is connectable. When the mobile device determines that the controlling device is connectable, the mobile device is connected to the at least one peripheral device via the controlling device and transmits a control signal to the at least one peripheral device. When the mobile device determines that the controlling device is unconnectable, the mobile device is directly connected to the at least one peripheral device and transmits the control signal to the at least one peripheral device. Therefore, when the controlling device is broken, a user may still operate the mobile device to control the at least one peripheral device.

7 Claims, 5 Drawing Sheets

HOME CONTROL SYSTEM

BACKGROUND OF THE INVENTION

1. Field of the Invention

The present invention relates to a control system and, particularly, to a home control system.

2. Description of the Prior Arts

A home control system may comprise a mobile device, a controlling device, and at least one peripheral device. The controlling device may be connected to the at least one peripheral device, and may be connected to Internet via an Internet device. The mobile device may be a smart phone or a tablet. The at least one peripheral device may be a television, an electric light, an electric fan, or an air conditioner.

A user may use the mobile device to connect to the controlling device via the Internet, and the user may operate the mobile device to transmit a control signal to the at least one peripheral device via the Internet and the controlling device. Therefore, the user may use the mobile device to remotely control the at least one peripheral device without at least one controller of the at least one peripheral device. Further, when the user is away from the house, the user may use the mobile device to turn on or off the at least one peripheral device via the Internet and the controlling device.

When any one of the controlling device and the Internet device is out of order, the user may not control the at least one peripheral device via the mobile device. Then, the user has to find the at least one controller of the at least one peripheral device to control the at least one peripheral device. However, finding the at least one controller of the at least one peripheral device is inconvenient for the user. Therefore, the home control system may be improved.

SUMMARY OF THE INVENTION

To overcome the shortcomings of the conventional home control system being inconvenient when any one of the controlling device and the Internet device is broken, the present invention provides a home control system.

The home control system comprises at least one peripheral device, a controlling device, and a mobile device. The controlling device is connected to the at least one peripheral device. The mobile device determines whether the controlling device is connectable.

When the mobile device determines that the controlling device is connectable, the mobile device is connected to the controlling device and transmits a control signal to the at least one peripheral device via the controlling device.

When the mobile device determines that the controlling device is unconnectable, the mobile device is directly and wirelessly connected to the at least one peripheral device and transmits the control signal to the at least one peripheral device.

The mobile device may be connected to the at least one peripheral device directly or via the controlling device. Therefore, when the controlling device is out of order, the mobile device is directly connected to the at least one peripheral device. Then, a user may still operate the mobile device to control the at least one peripheral device when the controlling device does not work. The shortcomings of the conventional home control system that is inconvenient when any one of the controlling device and the Internet device is out of order may be overcome.

DETAILED DESCRIPTION OF THE PREFERRED EMBODIMENTS

Other objectives, advantages and novel features of the invention will become more apparent from the following detailed description when taken in conjunction with the accompanying drawings.

Figure 1:
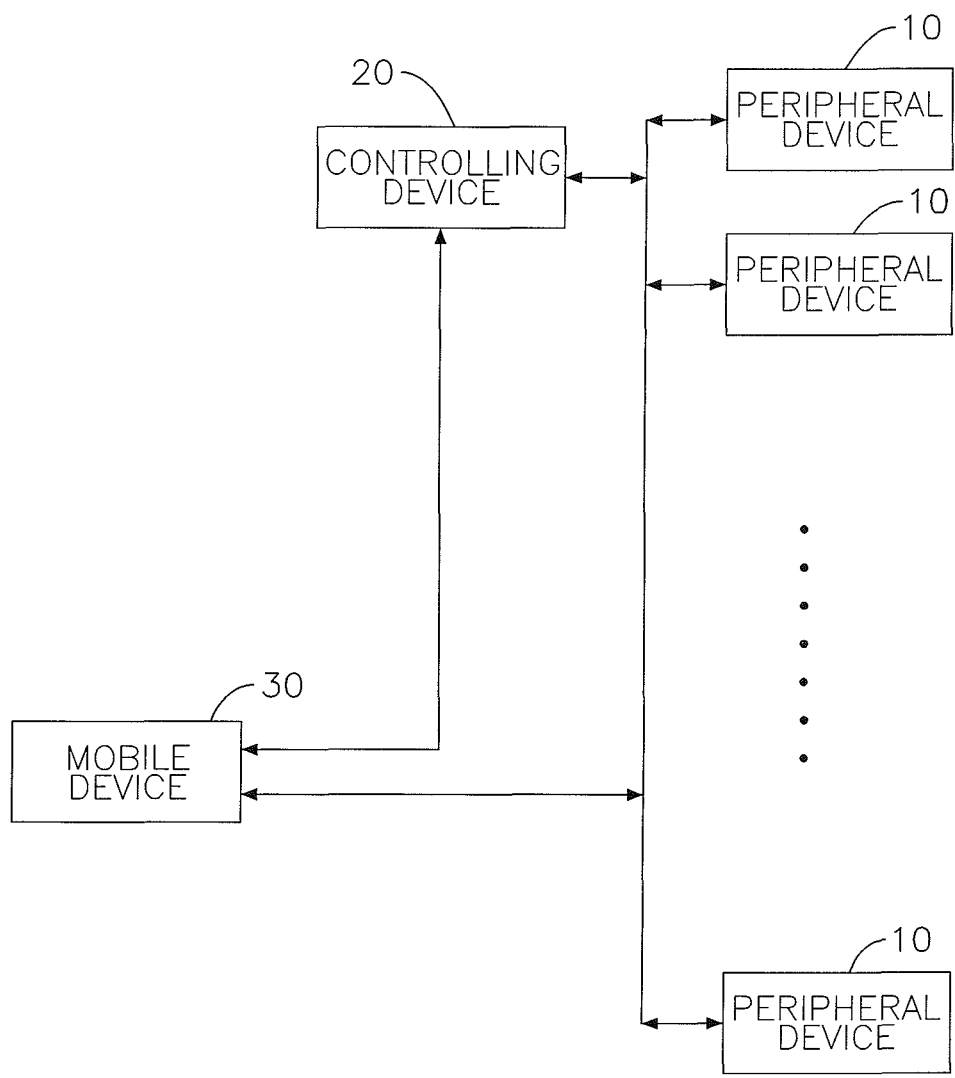
FIG. 1 is a system diagram of an embodiment of a home control system of the present invention.

With reference to FIG. 1, the present invention is a home control system. The home control system comprises at least one peripheral device 10, a controlling device 20, and a mobile device 30.

The controlling device 20 is connected to the at least one peripheral device 10. The mobile device 30 determines whether the controlling device 20 is connectable.

When the mobile device 30 determines that the controlling device 20 is connectable, the mobile device 30 is connected to the controlling device 20 and transmits a control signal to the at least one peripheral device 10 via the controlling device 20.

When the mobile device 30 determines that the controlling device 20 is unconnectable, the mobile device 30 is directly and wirelessly connected to the at least one peripheral device 10 and transmits the control signal to the at least one peripheral device 10.

Therefore, no matter whether the controlling device 20 is broken or not, the home control system may be normally operated, and a user may use the mobile device 20 to control the at least one peripheral device 10.

In the embodiment, the at least one peripheral device 10 may be a television, an air conditioner, an electric fan, or an electric curtain. The at least one peripheral device 10 is connected to the controlling device 20 via Bluetooth Low Energy (BLE) technology, ZigBee technology, or Z-wave technology when the mobile device 30 determines that the controlling device 20 is unconnectable. The at least one peripheral device 10 is connected to the mobile device 30 via Bluetooth Low Energy (BLE) technology, ZigBee technology, or Z-wave technology when the mobile device 30 determines that the controlling device 20 is connectable. The mobile device 30 may be connected to the controlling device 20 via Wi-Fi technology.

As shown in FIG. 1, when the controlling device 20 is normally operated, the mobile device 30 may determine that the controlling device 20 is connectable. Therefore, the mobile device 30 may be connected to the controlling device 20, and, further, the mobile device 30 may be connected to the at least one peripheral device 10 via the controlling device 20. The mobile device 30 may transmit the control signal to the at least one peripheral device 10, and the user may use the mobile device 30 to control the at least one peripheral device 10.

Figure 2:
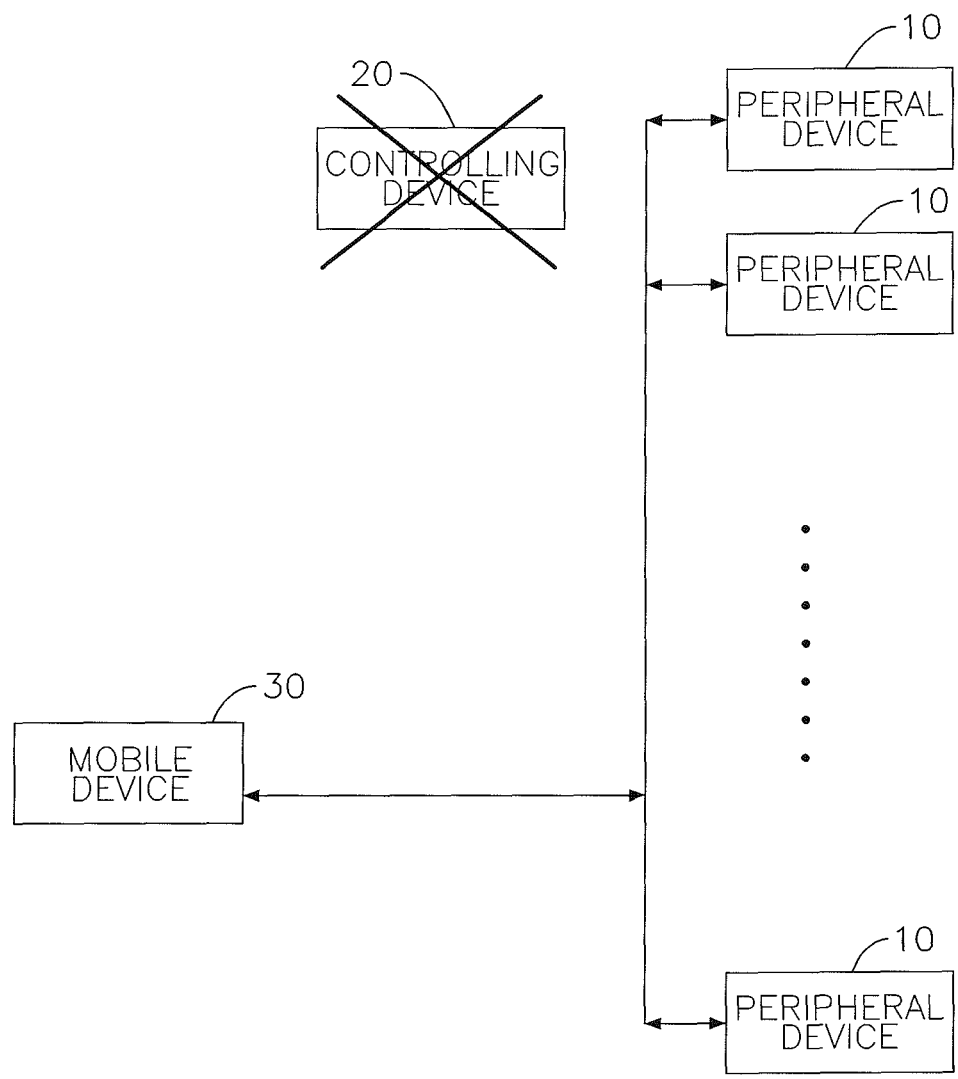
FIG. 2 is a system diagram of the home control system of FIG. 1 when a controlling device is broken.

As shown in FIG. 2, when the controlling device 20 is broken, the mobile device 30 may determine that the controlling device 20 is unconnectable. The mobile device 30 may be directly connected to the at least one peripheral device 10, and may transmit the control signal to the at least one peripheral device 10. Therefore, the user may still use the mobile device 30 to control the at least one peripheral device 10.

Figure 3:
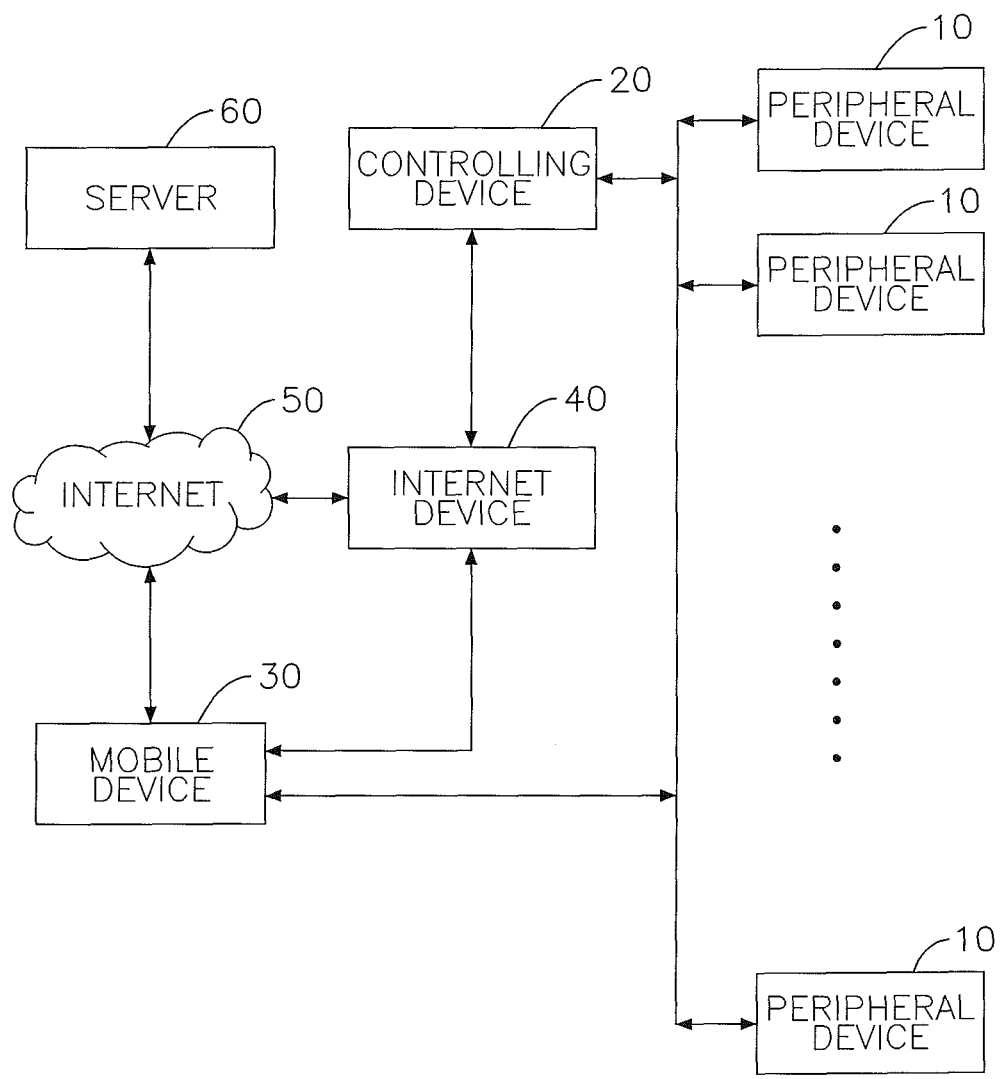
FIG. 3 is a system diagram of another embodiment of a home control system of the present invention.

With reference to FIG. 3, the home control system further comprises an Internet device 40. The Internet device 40 may be connected to the controlling device 20 and the Internet 50.

The mobile device 30 may be directly connected to the Internet device 40, and may be further connected to the controlling device 20 via the Internet device 40. Further, the mobile device 30 may be connected to the Internet 50, may be further connected to the Internet device 40 via the Internet 50, and may further be connected to the controlling device 20 via the Internet 50 and the Internet device 40.

In the embodiment, the Internet device 40 may be connected to the controlling device 20 via Wi-Fi technology. The Internet device 40 may be connected to the mobile device 30 via Wi-Fi technology.

As shown in FIG. 3, when the controlling device 20 and the Internet device 40 are normally operated, the user may use the mobile device 30. When the user uses the mobile device 30 at home, the mobile device 30 may be in a range of a wireless connection of the Internet device 40. The mobile device 30 may be directly connected to the Internet device 40. The mobile device 30 may further be connected to the controlling device 20 via the Internet device 40 and may further be connected to the at least one peripheral device 10 via the Internet device 40 and the controlling device 20. Then, the mobile device 30 may transmit the control signal to the at least one peripheral device 10 to control the at least one peripheral device 10.

When the user uses the mobile device 30 outdoors, the mobile device 30 may be out of a range of a wireless connection of the Internet device 40. The mobile device 30 may not be connected to the Internet device 40. However, the mobile device 30 may be connected to the Internet 50, and the mobile device 30 may be connected to the Internet device 40 via the Internet 50. Further, the mobile device 30 may be connected to the controlling device 20 via the Internet device 40 and the Internet 50, and may further be connected to the at least one peripheral device 10 via the controlling device 20, the Internet device 40, and the Internet 50. Then, the mobile device 30 may transmit the control signal to the at least one peripheral device 10 to control the at least one peripheral device 10.

The home control system further comprises a server 60. The server 60 may store at least one key. Each of the at least one key may correspond to each of the at least one peripheral device 10. When the Internet device 40 and the controlling device 20 are normally operated, the mobile device 30 determines that the controlling device 20 is connectable. The controlling device 20 may be connected to the server 60 via the Internet device 40 and the Internet 50. The controlling device 20 may load the at least one key from the server 60. Then, the controlling device 20 may verify the at least one key to determine whether the controlling device 20 is allowed to be connected to the at least one peripheral device 10 that corresponds to the loaded key. When the loaded key is successfully verified, the controlling device 20 may be connected to one of the at least one peripheral device 10 that corresponds to the loaded key, and the controlling device 20 may transmit the control signal to the at least one peripheral device 10 to control the at least one peripheral device 10.

Figure 4:
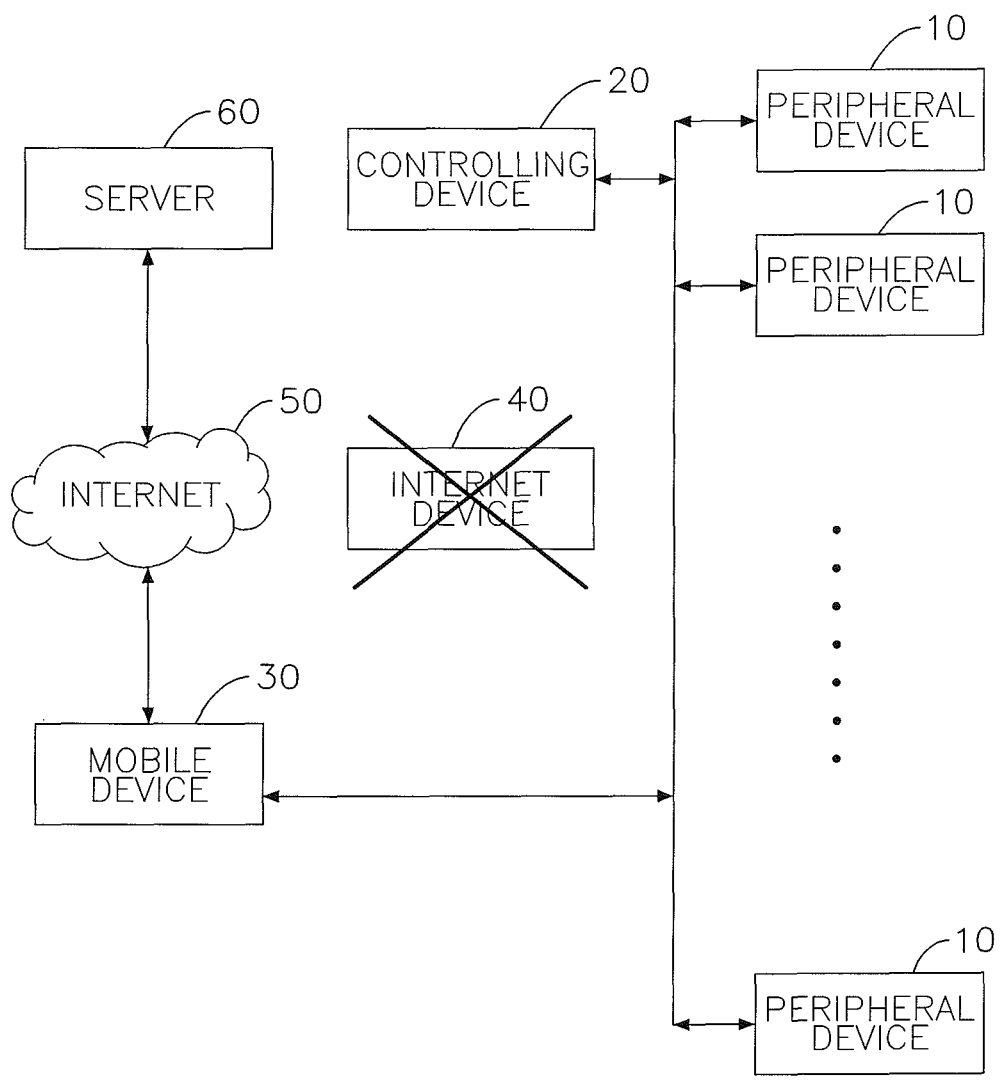
FIG. 4 is a system diagram of the home control system of FIG. 3 when an Internet device is broken.

With reference to FIG. 4, when each of the Internet device 40 or the controlling device 20 is broken, the mobile device 30 determines that the controlling device 20 is unconnectable. The mobile device 30 may not be connected to the at least one peripheral device 10 via the Internet device 40 and the controlling device 20. Then, the mobile device 30 may be directly connected to the at least one peripheral device 10. Therefore, the user may still use the mobile device 30 to control the at least one peripheral device 10.

In the embodiment, the mobile device 30 may be connected to the at least one peripheral device 10 via Bluetooth Low Energy (BLE) technology, ZigBee technology, or Z-wave technology. The mobile device 30 may be connected to the controlling device 20 via Wi-Fi technology. The mobile device 30 may be connected to the Internet device 40 via Wi-Fi technology. The mobile device 30 may be connected the Internet 50 via the third generation of mobile communication technology or the fourth generation of mobile communication technology.

As shown in FIG. 4, when the mobile device 30 determines that the controlling device 20 is unconnectable, the mobile device 30 may be directly connected to the at least one peripheral device 10, and the mobile device 30 may load the at least one key from the server 60 via the Internet 50. Then, the mobile device 30 may verify the at least one key to determine whether the mobile device 30 is allowed to be connected to the at least one peripheral device 10 that corresponds to the loaded key. When the loaded key is successfully verified, the mobile device 30 may be connected to one of the at least one peripheral device 10 that corresponds to the loaded key, and the mobile device 30 may transmit the control signal to the at least one peripheral device 10 to control the at least one peripheral device 10.

Only the mobile device 30 that is authorized to login to the server 60 may load the at least one key directly or via the controlling device 20 and may control the at least one peripheral device 10. Any other mobile device 30 that is unauthorized to login to the server 60 may not load the at least one key. Therefore, any other mobile device 30 may not control the at least one peripheral device 10, thereby ensuring that the at least one peripheral device 10 may not be controlled by another other mobile device 30, and security of the at least one peripheral device 10 may be improved.

Figure 5:
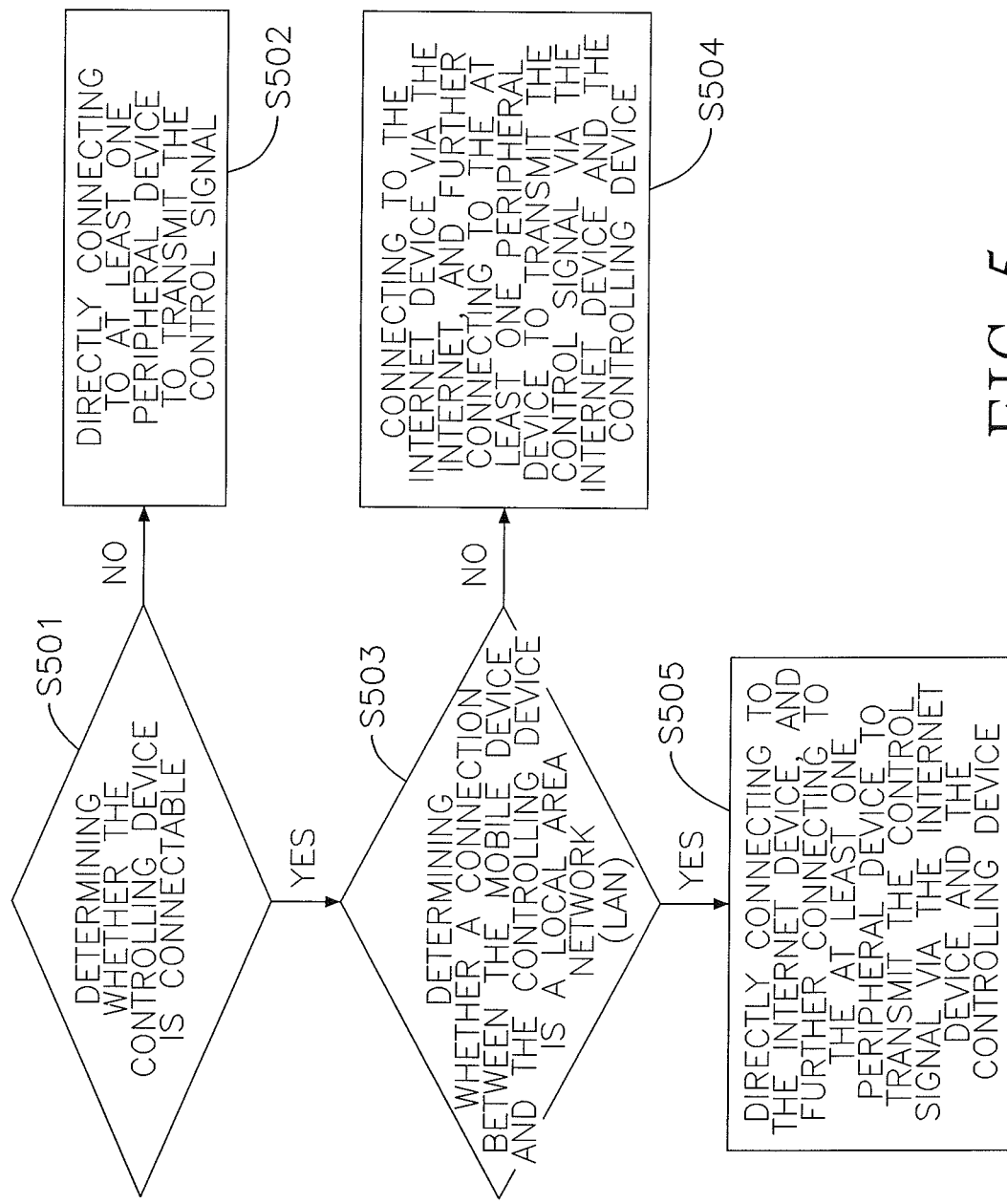
FIG. 5 is a flowchart executed by a mobile device of the home control system of the present invention.

With reference to FIG. 5, a connection method is provided to further explain how the mobile device 30 is connected to the at least one peripheral device 10. The mobile device 30 may execute the connection method to be connected to the at least one peripheral device 10. The connection method comprises the steps of:

determining whether the controlling device 20 is connectable (S501);

when the mobile device 30 determines that the controlling device 20 is unconnectable, directly connecting to at least one peripheral device 10 to transmit the control signal (S502);

when the mobile device 30 determines that the controlling device 20 is connectable, determining whether a connection between the mobile device 30 and the controlling device 20 is a local area network (LAN) (S503);

when the connection between the mobile device 30 and the controlling device 20 is not the LAN, connecting to the Internet device 40 via the Internet 50, and further connecting to the at least one peripheral device 10 to transmit the control signal via the Internet device 40 and the controlling device 20 (S504);

when the connection between the mobile device 30 and the controlling device 20 is the LAN, directly connecting to the Internet device 40, and further connecting to the at least one peripheral device 10 to transmit the control signal via the Internet device 40 and the controlling device 20 (S505).

In the embodiment of the connection method, the mobile device 30 may be connected to the at least one peripheral device 10 by Bluetooth Low Energy (BLE) technology, ZigBee technology, or Z-wave technology. The mobile device 30 may be connected to the Internet device 40 by Wi-Fi technology. The mobile device 30 may be connected to the Internet 50 by the third generation of mobile communication technology or the fourth generation of mobile communication technology.

The mobile device 30 may be directly connected to the at least one peripheral device 10. Therefore, when the controlling device 20 or the Internet device 40 is broken, the mobile device 30 may be still connected to the at least one peripheral device 10 to control the at least one peripheral device 10. The shortcomings of the conventional home control system being inconvenient when any one, of the controlling device 20 or the Internet device 40 is broken may be overcome.

Even though numerous characteristics and advantages of the present invention are revealed and described as above, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A home control system comprising:
   at least one peripheral device;
   a controlling device connected to the at least one peripheral device;
   a mobile device determining whether the controlling device is connectable to the mobile device;
   an Internet device connected to the controlling device and the Internet; and
   a server storing at least one key, wherein each of the at least one key corresponds to each of the at least one peripheral device;
   wherein when the mobile device determines that the controlling device is connectable to the mobile device, the mobile device is connected to the controlling device and transmits a control signal to the at least one peripheral device via the controlling device;
   wherein when the mobile device determines that the controlling device is unconnectable to the mobile device, the mobile device is directly and wirelessly connected to the at least one peripheral device and transmits the control signal to the at least one peripheral device;
   wherein the mobile device is directly connected to the Internet device and further to the controlling device via the Internet device, or the mobile device is connected to the Internet device via the Internet and further to the controlling device via the Internet device;
   wherein when the mobile device determines that the controlling device is connectable to the mobile device, the controlling device is connected to the server via the Internet device and the Internet and loads the at least one key from the server;
   wherein the controlling device verifies the at least one key to determine whether the controlling device is allowed to be connected to the at least one peripheral device that corresponds to the at least one key loaded from the server;
   wherein when the at least one key loaded from the server is successfully verified, the controlling device is connected to one of the at least one peripheral device that corresponds to the at least one key loaded from the server and transmits the control signal to the at least one peripheral device to control the at least one peripheral device;
   wherein when the mobile device determines that the controlling device is unconnectable to the mobile device, the mobile device is directly connected to the at least one peripheral device, the mobile device is connected to the server via the Internet and loads the at least one key from the server via the Internet, and the mobile device verifies the at least one key to determine whether the mobile device is allowed to be connected to the at least one peripheral device that corresponds to the at least one key loaded from the server key; and
   wherein when the at least one key loaded from the server is successfully verified, the mobile device is connected to one of the at least one peripheral device that corresponds to the at least one key loaded from the server, and transmits the control signal to the at least one peripheral device to control the at least one peripheral device.

2. The home control system as claimed in claim 1, wherein the mobile device is connected to the at least one peripheral device by Bluetooth Low Energy (BLE) technology, ZigBee technology, or Z-wave technology when the mobile device determines that the controlling device is unconnectable to the mobile device; and
   wherein the controlling device is connected to the at least one peripheral device by the Bluetooth Low Energy (BLE) technology, the ZigBee technology, or the Z-wave technology when the mobile device determines that the controlling device is connectable to the mobile device.

3. The home control system as claimed in claim 1, wherein the Internet device is connected to the controlling device by the Wi-Fi technology; and
   the Internet device is connected to the mobile device by the Wi-Fi technology.

4. The home control system as claimed in claim 1, wherein the mobile device is connected to the controlling device by Wi-Fi technology.

5. A home control system comprising:
   at least one peripheral device;
   a controlling device connected to the at least one peripheral device;
   a mobile device determining whether the controlling device is connectable to the mobile device;
   an Internet device connected to the controlling device and the Internet; and
   a server storing at least one key, wherein each of the at least one key corresponds to each of the at least one peripheral device;
   wherein when the mobile device determines that the controlling device is connectable to the mobile device, the mobile device is connected to the controlling device and transmits a control signal to the at least one peripheral device via the controlling device;
   wherein when the mobile device determines that the controlling device is unconnectable to the mobile device, the mobile device is directly and wirelessly connected to the at least one peripheral device and transmits the control signal to the at least one peripheral device;
   wherein the mobile device is directly connected to the Internet device and further to the controlling device via the Internet device, or the mobile device is connected to the Internet device via the Internet and further to the controlling device via the Internet device;

wherein when the mobile device determines that the controlling device is connectable to the mobile device, the controlling device is connected to the server via the Internet device and the Internet and loads the at least one key from the server;

wherein the controlling device verifies the at least one key to determine whether the controlling device is allowed to be connected to the at least one peripheral device that corresponds to the at least one key loaded from the server;

wherein when the at least one key loaded from the server is successfully verified, the controlling device is connected to one of the at least one peripheral device that corresponds to the at least one key loaded from the server and transmits the control signal to the at least one peripheral device to control the at least one peripheral device;

wherein the mobile device is connected to the at least one peripheral device by Bluetooth Low Energy (BLE) technology, ZigBee technology, or Z-wave technology when the mobile device determines that the controlling device is unconnectable to the mobile device; and wherein the controlling device is connected to the at least one peripheral device by the Bluetooth Low Energy (BLE) technology, the ZigBee technology, or the Z-wave technology when the mobile device determines that the controlling device is connectable to the mobile device.

6. The home control system as claimed in claim 5, wherein the Internet device is connected to the controlling device by the Wi-Fi technology; and the Internet device is connected to the mobile device by the Wi-Fi technology.

7. The home control system as claimed in claim 5, wherein the mobile device is connected to the controlling device by Wi-Fi technology.

* * * * *